United States Patent
Walker et al.

(10) Patent No.: US 7,501,181 B2
(45) Date of Patent: Mar. 10, 2009

(54) BI- OR TRI-LAYER ANTI-OXIDATION SYSTEM FOR CARBON COMPOSITE BRAKES

(75) Inventors: Terence B. Walker, South Bend, IN (US); Laurie A. Booker, South Bend, IN (US); Michelle L. Shreve, South Bend, IN (US); Manuel G. Koucouthakis, Granger, IN (US)

(73) Assignee: Honeywell International Inc., Morris Township, NJ (US)

( * ) Notice: Subject to any disclaimer, the term of this patent is extended or adjusted under 35 U.S.C. 154(b) by 54 days.

(21) Appl. No.: 11/377,446

(22) Filed: Mar. 17, 2006

(65) Prior Publication Data

US 2007/0218208 A1  Sep. 20, 2007

(51) Int. Cl.
 *B32B 9/00* (2006.01)
(52) U.S. Cl. ..................................... 428/408
(58) Field of Classification Search ............. 428/408, 428/698; 427/376.2, 313; 106/36
 See application file for complete search history.

(56) References Cited

U.S. PATENT DOCUMENTS

| | | | |
|---|---|---|---|
| 4,837,073 A | 6/1989 | McAllister et al. | |
| 5,283,109 A | 2/1994 | Kaplan et al. | |
| 5,962,135 A | 10/1999 | Walker et al. | |
| 6,093,482 A | 7/2000 | Park et al. | |
| 6,245,424 B1 * | 6/2001 | Lau et al. | 428/368 |
| 6,358,565 B1 | 3/2002 | Krenkel et al. | |
| 6,455,159 B1 | 9/2002 | Walker et al. | |
| 6,555,173 B1 | 4/2003 | Forsythe et al. | |
| 6,726,753 B2 * | 4/2004 | Koucouthakis et al. | 106/14.12 |
| 6,749,937 B2 | 6/2004 | Gray | |
| 6,756,121 B2 | 6/2004 | Forsythe et al. | |
| 6,884,467 B2 * | 4/2005 | Walker et al. | 427/376.2 |
| 6,886,668 B2 * | 5/2005 | Koucouthakis et al. | 188/218 XL |
| 6,896,968 B2 | 5/2005 | Golecki | |

(Continued)

FOREIGN PATENT DOCUMENTS

JP  59-174587 A  10/1984

(Continued)

*Primary Examiner*—Keith D Hendricks
*Assistant Examiner*—Daniel Miller
(74) *Attorney, Agent, or Firm*—Birch, Stewart, Kolasch & Birch, LLP

(57) ABSTRACT

Coated article, e.g., a brake disc, comprising a carbon-carbon composite component or a carbon-carbon-silicon carbide component coated at least with a phosphorus-containing antioxidant undercoating, the undercoating being covered by a silicon carbide particle-containing overcoating of alkali or alkaline earth metal silicate, pH modifier, and silicon carbide particles. Also, method of protecting a carbon-carbon composite brake disc or a carbon-carbon-silicon carbide composite brake disc against oxidation, by: coating the composite brake disc with a first phosphoric acid-based penetrant system; curing the penetrant coating at a temperature of 200° C. or above to form a first coating on the composite brake disc; applying the ceramic coating composition of claim 1 over the first coating and curing the ceramic coating at a temperature below 200° C. to form a second coating on the composite brake disc; and optionally coating the coated composite brake disc so obtained with a second phosphoric acid-based penetrant system; and curing the penetrant coating at a temperature of 200° C. or above to form a third coating on the composite brake disc.

5 Claims, 2 Drawing Sheets

U.S. PATENT DOCUMENTS

| | | | |
|---|---|---|---|
| 7,118,805 B2 * | 10/2006 | Walker et al. | 428/408 |
| 2003/0021901 A1 | 1/2003 | Gasse | |
| 2003/0143436 A1 * | 7/2003 | Forsythe et al. | 428/698 |
| 2003/0214064 A1 | 11/2003 | Shin et al. | |
| 2004/0020728 A1 | 2/2004 | Koucouthakis et al. | |
| 2004/0202896 A1 | 10/2004 | Gray | |
| 2004/0219510 A1 | 11/2004 | Lowery et al. | |

FOREIGN PATENT DOCUMENTS

| | | |
|---|---|---|
| WO | WO-99/08980 A1 | 2/1999 |

* cited by examiner

BI- OR TRI-LAYER ANTI-OXIDATION SYSTEM FOR CARBON COMPOSITE BRAKES

FIELD OF THE INVENTION

This invention relates to novel oxidation-resistant coating systems for carbon-carbon composites (including carbon-carbon-SiC composites). This invention also contemplates methods for the preparation of the oxidatively protected composites. This invention is of particular utility in the field of aircraft braking systems.

BACKGROUND OF THE INVENTION

Carbon-carbon composite brake discs and carbon-carbon-silicon carbide composite brake discs are subject to oxidation in their normal operating environments. Such composite brake discs have been protected against oxidation by coating them with phosphoric acid-based penetrants. However, currently used phosphoric acid-based penetrants are subject to degradation at peak operating conditions.

Carbon-carbon composites are a class of unique materials whose properties, especially at elevated temperatures, make them attractive for various aerospace applications. The materials are composites, although often all the composite elements are comprised essentially of carbon in its various allotropic forms. Factors such as the degree of graphitization, purity, pore structure, specific surface areas, surface complexes, oxygen availability, and temperature have a strong influence on the oxidation of carbon materials. Oxidation of carbon-carbon composites at elevated temperatures in an atmospheric environment has a catastrophic effect on the mechanical properties of the composites. Some form of oxidation protection is required in order to maintain structural capability.

One approach is the application of a refractory ceramic barrier coating. SiC is known to be a useful coating for this purpose. U.S. Pat. No. 5,283,109 teaches a silicon carbide-coated carbon composite formed with a carbon interlayer. The carbon interlayer is prepared by coating a carbon composite base with a paste-like mixture of carbon powder and a liquid carrier followed by curing. The coated carbon composite is then subjected to chemical vapor deposition with silicon carbide. An open porous layer is needed to allow penetration of the chemical vapor. This final coated composite is inadequate for applications such as airplane brakes, due to a tendency for the composite to crack or peel under extreme conditions as a result of the relatively weak bond between the carbon interlayer and either the carbon composite base or the silicon carbide layer.

Forsythe and Walker disclose (U.S. Pat. No. 6,555,173 B1 and U.S. Pat. No. 6,756,121 B2) a silicon carbide-coated C—C composite that is resistant to oxidation at high temperatures. The composite is prepared by coating a C—C composite base with a reactive carbon-containing composition followed by applying a silicon-containing composition to the reactive carbon-coated C—C composite to form a bi-layered C—C composite, then heating the bi-layered C—C composite to at least the melting point of silicon to form the silicon carbide-coated C—C composite, and optionally applying a phosphorus-containing retardant solution to the silicon carbide-coated C—C composite.

SUMMARY OF THE INVENTION

The present invention provides a low cost silicon carbide ceramic overcoating for phosphoric acid-based penetrant coated composite brake discs. The low cost silicon carbide overcoating provided by the present invention does not require high temperature curing. The ceramic overcoating composition of this invention includes sub-micron size silicon carbide particles, water-miscible silicate binders, and pH modifiers.

One embodiment of this invention provides a ceramic coating composition comprising 10-30 weight-% particulate silicon carbide, 60-80 weight-% water-miscible silicate binder component (e.g., alkali or alkaline earth metal silicate), and up to 20 weight-% pH modifier. The particulate silicon carbide is preferably submicron-size silicon carbide particles. In many cases, the silicon carbide particles will have particle sizes ranging from 0.05 to 0.5 microns. A particularly convenient embodiment employs silicon carbide particles having a particle size of 325 mesh. One specific embodiment of this silicon carbide particle-containing overcoating contains, on a solids basis, about 70 wt-% alkali metal silicate, about 10 wt-% alkali metal hydroxide, and about 20 wt-% silicon carbide particles having an average particle size of 0.1-0.2 microns.

Another embodiment of the present invention is a coated article—e.g., an aircraft landing system brake disc—comprising a carbon-carbon composite component or a carbon-carbon-silicon carbide component, covered by—that is, coated with—a coating system that includes a phosphorus-containing antioxidant undercoating (e.g. with a thickness of approximately 1-10 mil), the undercoating being in turn covered by a silicon carbide particle-containing overcoating (e.g. with a thickness of approximately 1-10 mil), where the overcoating is made from 60-80 wt-% (preferably 65-75 wt-%) water-miscible silicate-based binder solution, up to 20 wt-% (preferably 5-25 wt-%) alkali metal hydroxide or other pH modifier, and 10-30 wt-% (preferably 15-25 wt-%) silicon carbide particles.

This invention also provides a method of protecting a carbon-carbon composite brake disc or a carbon-carbon-silicon carbide composite brake disc against oxidation. The method includes: coating the composite brake disc with a first phosphoric acid-based penetrant system; curing the penetrant coating at a temperature of 200° C. or above to form a first coating on the composite brake disc; applying the ceramic coating composition of claim 1 over the first coating and curing the ceramic coating at a temperature below 200° C. to form a second coating on the composite brake disc; and optionally coating the coated composite brake disc so obtained with a second phosphoric acid-based penetrant system; and curing the penetrant coating at a temperature of 200° C. or above to form a third coating on the composite brake disc.

BRIEF DESCRIPTION OF THE DRAWINGS

The present invention will be more fully understood by reference to the detailed description given hereinbelow and the accompanying drawings. The drawings are not to scale, and are given by way of illustration only. They do not in any way limit the present invention.

DETAILED DISCLOSURE OF THE INVENTION

Figure 1:
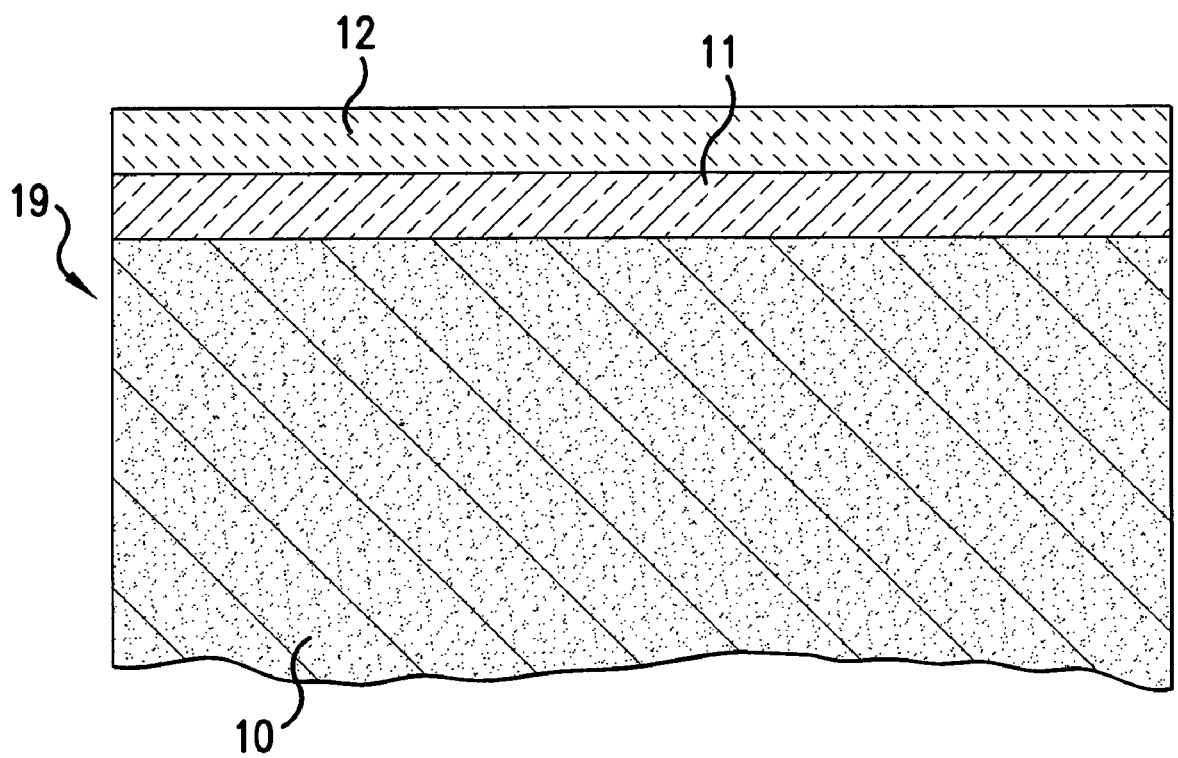
FIG. 1 is a schematic view of a carbon-carbon composite substrate having a bi-layer coating system formed in accordance with the present invention.

One embodiment of the present invention is embodied by a carbon fiber or C—C composite component that is coated with a two-layer anti-oxidant system. For a better understanding of this embodiment of the invention, attention is directed to FIG. 1, wherein a coated carbon fiber or C—C article component is generally illustrated at 19. A component 10 is covered by a protective undercoating 11 (phosphorus-containing glass) and the undercoating 11 is covered by a protective overcoating 12 (ceramic containing sub-micron size silicon carbide particles, water-miscible silicate binders, and pH modifiers). The present application often refers to carbon composites for convenience. However, component 10 can likewise be a carbon-carbon-silicon carbide composite, of the type described e.g. in U.S. Pat. No. 6,749,937 B2.

Component 10

Before the first fluidized glass formulation is applied to the C—C composite component, the component may be fabricated into a desired shape. The present invention is particularly valuable when the C—C composite component is an aircraft landing system brake disc.

Carbon-carbon composites are generally prepared from carbon preforms. Carbon preforms are made of carbon fibers, formed for instance from fibers of pre-oxidized polyacrylonitrile (PAN). These fibers can be layered together to form shapes, such as friction brake discs, which shapes are then heated and infiltrated with methane or another pyrolyzable carbon source to form the C—C composite preforms. Carbon-carbon composites useful in accordance with the present invention typically have densities in the range of from about 1.6 g/cm$^3$ through 2.0 g/cm$^3$. Methods of manufacturing C—C composites are generally well known to those skilled in the art. A good reference in this area is: Buckley et al., *Carbon-Carbon Materials and Composites*, Noyes Publications, 1993. The entire contents of this publication are hereby expressly incorporated by reference.

For purposes of illustration only, the C—C composite component 10 may be fabricated from woven fabric panes of pitch-based Amoco P30X carbon fiber tows in a harness satin weave or from a pitch-based Nippon XNC25 in a plain weave. The tows are rigidized with a few weight-% carbon-containing resin, such as epoxy Novolac. The material is then carbonized at a temperature in the range of 800-1000° C. and densified by carbon CVD. The resulting materials is then annealed in an inert gas at a temperature in the range of 1600-2600° C. This process creates a C—C composite component that is adaptable for use in high temperature environments when it is properly protected against oxidation. It is understood that the oxidation protective coating system of the present invention is applicable to C—C composite components regardless of how the C—C composite components are fabricated.

Undercoating 11

The C—C component 10 is immersed or dipped in a liquid penetrant solution for several minutes. Preferred precursors for use in applying the undercoating layer in accordance with the present invention are phosphoric acid-based penetrant salt solutions, which are described in detail in U.S. Pat. No. 6,455,159 B1, the entire disclosure of which is hereby expressly incorporated by reference. A typical penetrant salt solution that can be used to form the undercoating herein could contain from 5-80 wt % $H_2O$, 10-70 wt % $H_3PO_4$, up to 25 wt % alkali metal mono-, di-, or tri-basic phosphate, and up to 2 wt % $B_2O_3$. The typical penetrant salt solution will also include at least one of $MnHPO_4.1.6H_2O$, $AlPO_4$, and $Zn_3(PO_4)_2$, in weight-percentages up to 25 wt-%, 30 wt-%, and 10 wt-%, respectively.

In accordance with this invention, the surface of the carbon-carbon composite or graphitic material is treated with the penetrant solution by painting, dipping, or other conventional application techniques. Subsequently the surface-treated material is cured at a temperature in the range of 250-900° C. Typically, the surface is treated with one to three coats of the penetrant solution, and the peak temperature is generally held for one to six hours.

Overcoating 12

The composite component 10 bearing the undercoating 11 is immersed in a fluidized precursor bath or painted with the fluidized precursor to cover the undercoated component with an overcoating 12. In accordance with this invention, the overcoating 12 will comprise 60-80 wt-% silicate binder (e.g., composed of alkali or alkaline earth metal silicates), up to 20 wt-% alkali metal hydroxide (typically potassium hydroxide or sodium hydroxide) as a pH modifier, and 10-30 wt-% particulate silicon carbide. Cerama-Bind 830, manufactured by Aremco Products, Inc. of Valley Cottage, N.Y., is a commercially available example of a product which may be used as the silicate binder. Cerama-Bind 830 is a water-miscible silicate-based binder solution. In accordance with a preferred embodiment of this invention, the silicon carbide particles will be submicron size. That is, the silicon carbide particles employed to make overcoating 12 will range in average diameter e.g. from 0.05 to 0.5 microns. A commercially available example of a product which may be used as the particulate silicon carbide component of the present invention is Silicon Carbide Item #44647, a 0.1-0.2 micron silicon carbide powder available from Alfa Aesar (a Johnson Matthey Company) of Ward Hill, Mass. A specific embodiment of overcoating layer 12 in accordance with this invention could contain 71.2 weight-% Cerama-Bind 830, 9 weight-% potassium hydroxide, and 19.8 weight-% sub-micron particle size silicon carbide, 325 mesh, from Alfa Aesar.

The C—C component 10 with its solid glass undercoating 11 is immersed or dipped in a liquid bath precursor of fluidized silicon carbide-particle suspension for several minutes. The liquid precursor is maintained at a temperature in the range of approximately 20-90° C. The component 10 may be rotated relative to the liquid precursor to improve the wetting characteristics and uniformity of the coating.

The fluidized SiC particles-silicate-hydroxide-containing coating is converted to a solid coating 12 by air-drying at ambient temperatures. If desired, drying may be accelerated by gentle heating. This results in completely coating the composite, and forms—with solid glass coating 11—a protective barrier against undesirable oxidation of C—C component 10. In other words, at this stage, the composite component 10 is permanently coated with a protective coating system (11, 12).

Variability

The properties of the glass material 11 and ceramic material 12 may be tailored to the temperature range over which and/or oxidation catalysts to which coating system (11, 12) is designed to protect the composite component 10 from destructive oxidation. Likewise, the thicknesses of and numbers of protective coatings applied to component 10 will depend on the method of applying the coating and the intended use for the coated article 19. If the coated article will be subjected to sustained or repeated high temperatures, a number of separate sub-layers may be applied to make up undercoating 11 and/or overcoating 12. This antioxidant coating system may be used on a wide variety of carbon fiber or carbon-carbon composite articles, including but not limited to aircraft landing system brake discs.

Coating 13

Figure 2:
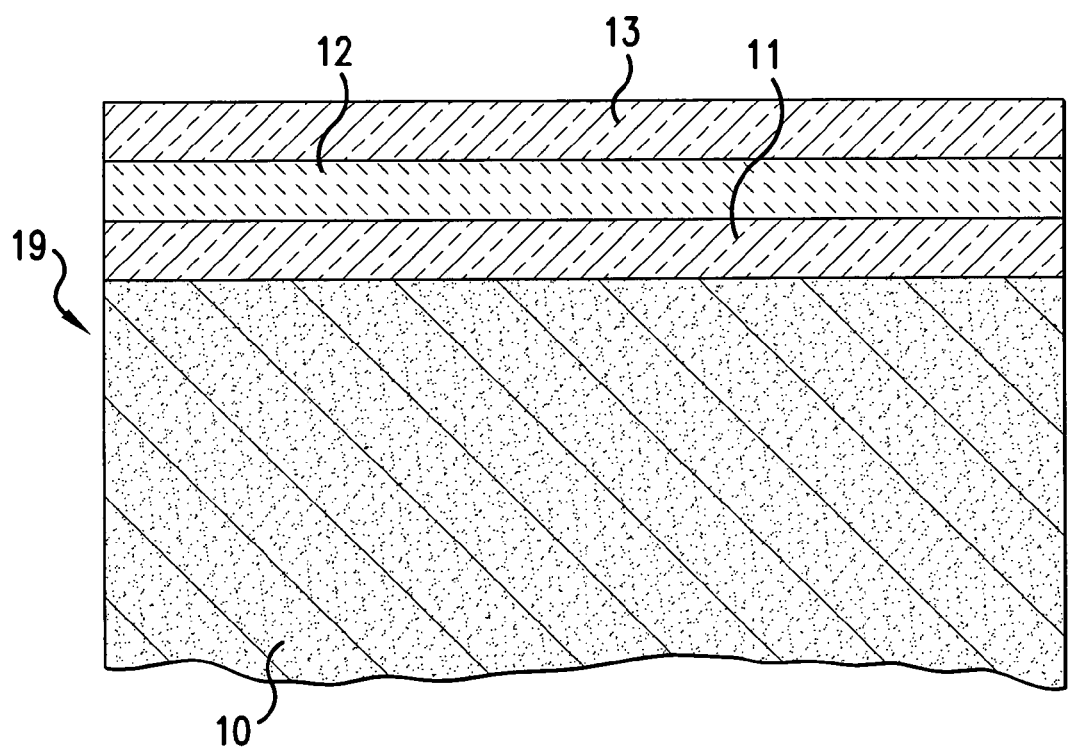
FIG. 2 is a schematic view of a carbon-carbon composite substrate having a tri-layer coating system formed in accordance with the present invention.

Another embodiment of the present invention is embodied by a carbon fiber or C—C composite component that is coated with a three-layer anti-oxidant system. For a better understanding of this embodiment of the invention, attention is directed to FIG. 2, wherein a coated carbon fiber or C—C article component is generally illustrated at 19. A component 10 is covered by a protective undercoating 11 (phosphorus-containing glass) and the undercoating 11 is covered by a protective coating 12 (ceramic containing sub-micron size silicon carbide particles, water-miscible silicate binders, and pH modifiers). In turn, the overcoating layer 12 is covered by a protective coating 13 (phosphorus-containing glass). Coating 13 may be made of the same materials as is coating 11. However, the precise formulation of coating 13 need not necessarily be precisely the same as that used for coating 11 in a given application. Third coating layer 13 may be applied when the composite article is originally manufactured. Alternatively, third coating layer 13 may be applied, for instance, to a bi-layer composite brake disc made in accordance with this invention when the bi-layer disc is being refurbished.

While the present invention has been described with respect to detailed examples of its implementation, the invention is capable of numerous modifications, rearrangements, and alterations, and such are intended to be within the spirit and scope of the disclosure and claims.

What is claimed is:

1. A coated article comprising a carbon-carbon composite component having a density in the range of from about 1.6 g/cm$^3$ through 2.0 g/cm$^3$, said carbon-carbon composite component configured as an aircraft landing system brake disc and being covered by a phosphorus-containing antioxidant undercoating having a thickness of approximately 1-10 mil annealed to said carbon-carbon composite component at a temperature in the range of 250-900° C., said undercoating being covered by a silicon carbide particle-containing overcoating having a thickness of approximately 1-10 mil dried onto said undercoating at ambient temperature for at least one hour, said overcoating being made from 60-80 wt-% water-miscible silicate-based binder solution, up to 20 wt-% alkali metal hydroxide, and 10-30 wt-% silicon carbide, wherein the silicon carbide component of said silicon carbide particle-containing overcoating consists of silicon carbide particles having particle sizes ranging from 0.05 to 0.5 microns.

2. The coated article of claim 1, wherein the silicon carbide particles have a particle size of 325 mesh.

3. The coated article of claim 1, wherein said silicon carbide particle-containing overcoating comprises 65-75 wt-% alkali metal silicate, 5-15 wt-% alkali metal hydroxide, and 15-25 wt-% silicon carbide particles.

4. The coated article of claim 1, wherein said silicon carbide particle-containing overcoating comprises, on a solids basis, about 70 wt-% alkali metal silicate, about 10 wt-% alkali metal hydroxide, and about 20 wt-% silicon carbide particles having an average particle size of 0.1-0.2 microns.

5. The coated article of claim 1, wherein said phosphorus-containing antioxidant undercoating is formed from a penetrant salt solution containing from 5-80 wt % H$_2$O, 10-70 wt % H$_3$PO$_4$, up to 25 wt % alkali metal mono-, di-, or tri-basic phosphate, up to 2 wt % B$_2$O$_3$, and at least one of MnHPO$_4$·1.6H$_2$O, AlPO$_4$, and Zn$_3$(PO$_4$)$_2$, in weight-percentages up to 25 wt-%, 30 wt-%, and 10 wt-%, respectively.

* * * * *